W. & J. WHAIT.
Sulky Harrow and Cultivator.

No. 67,009.  Patented July 23, 1867.

Witnesses:
F. Lehmann
Jno. A. Ellis

Inventor:
Jas. Whait
Wm. Whait
per J. H. Alexander & Co.
Attys

United States Patent Office.

WILLIAM WHAIT AND JAMES WHAIT, OF INDEPENDENCE, IOWA.

Letters Patent No. 67,009, dated July 23, 1867.

SULKY-HARROW AND CULTIVATOR.

The Schedule referred to in these Letters Patent and making part of the same.

TO ALL WHOM IT MAY CONCERN:

Be it known that we, JAMES WHAIT and WILLIAM WHAIT, of Independence, county of Buchanan, and State of Iowa, have invented certain new and useful Improvements in Combined Sulky-Harrows and Cultivators; and we do hereby declare that the following is a full, clear, and exact description of the same, reference being had to the annexed drawings, and to the letters of reference marked thereon, in which—

Figure 1:
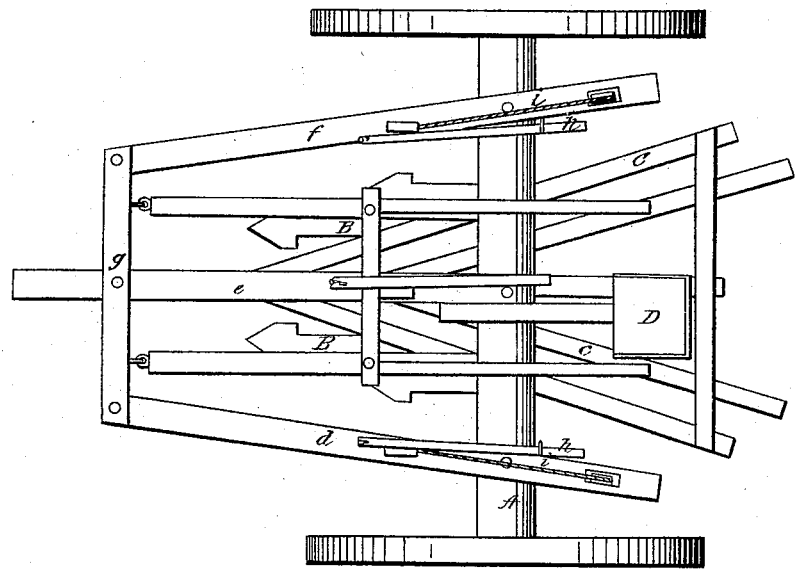

Figure 1 represents a plan view, and

Figure 2:
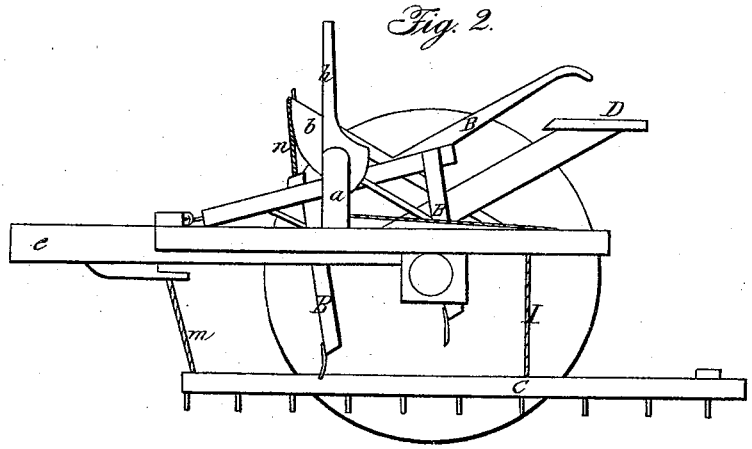

Figure 2 a side elevation.

The nature of our invention consists in the employment and combination of certain devices, the peculiarities of which will be hereinafter fully set forth.

A represents the axle, provided with wheels, and to which is secured the frame, consisting of pieces $d\,e\,f\,g$, as fully shown in fig. 1. B represents the cultivator, which may be constructed and arranged as seen in the same figure. To the cross-piece $g$ the cultivator is hinged, in order that it may be raised and its particular work suspended at any moment occasion may require. C represents the harrow, which is also so similar in its construction to the ordinary harrow that a minute description is unnecessary. $h\,h$ are levers, the peculiar shape of which is seen in fig. 2. These levers are pivoted to the uprights $a\,a$. $i\,i$ are cords, attached to the end of levers $h\,h$. Said cords pass over pulleys in the end of pieces $d\,f$, and are connected to the harrow by means of staples. The front part of the harrow is attached to the piece or tongue $e$ by the cord $m$. $b$ represents another lever, constructed similarly to those just referred to, and is pivoted to an upright or piece or tongue, $e$. This lever is connected with the cultivator by means of cord $n$, as seen in fig. 2. D represents the seat for the operator.

Thus it will be observed that we combine the working of a cultivator and harrow in one, while the operation of each may be suspended by means of the levers.

What we claim, and desire to secure by Letters Patent, is—

The cultivator B, harrow C, levers $h\,h$ and $b$, and cords $i\,i$ and $m$, the whole being combined and operated as and for the purpose set forth and described.

In testimony whereof we set our signatures in presence of two witnesses.

WILLIAM WHAIT,
JAMES WHAIT.

Witnesses:
W. DALE,
TILLMAN OZIAS.